United States Patent
Mishima (10) Patent No.: US 8,315,458 B2
(45) Date of Patent: Nov. 20, 2012

(54) IMAGE-PROCESSING DEVICE, IMAGE-FORMING DEVICE, IMAGE-PROCESSING METHOD, AND COMPUTER READABLE MEDIUM

(75) Inventor: Yu Mishima, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 618 days.

(21) Appl. No.: 12/564,938

(22) Filed: Sep. 23, 2009

(65) Prior Publication Data

US 2010/0245896 A1    Sep. 30, 2010

(30) Foreign Application Priority Data

Mar. 25, 2009   (JP) ................. 2009-075176

(51) Int. Cl.
  *G06K 9/00*   (2006.01)
  *G06K 9/34*   (2006.01)
  *G06K 9/36*   (2006.01)
  *G06K 9/46*   (2006.01)
  *G06K 9/66*   (2006.01)
  *H04N 9/74*   (2006.01)

(52) U.S. Cl. ........ 382/162; 382/164; 382/173; 382/192; 382/276; 348/578

(58) Field of Classification Search .......... 382/162, 382/164, 173, 192, 276; 348/578
See application file for complete search history.

(56) References Cited

U.S. PATENT DOCUMENTS

| 2004/0027594 A1* | 2/2004 | Suzuki et al. ............ 358/1.2 |
| 2009/0202173 A1* | 8/2009 | Weiss et al. ............ 382/276 |
| 2010/0214483 A1* | 8/2010 | Gann et al. ............ 348/578 |

FOREIGN PATENT DOCUMENTS

JP    2004-080118 A    3/2004

* cited by examiner

*Primary Examiner* — Bernard Krasnic
(74) *Attorney, Agent, or Firm* — Sughrue Mion, PLLC

(57) ABSTRACT

An image-processing device includes: an obtaining unit that obtains image data; an area extraction unit that extracts an area having a color falling within a predetermined range of a color within a color space, in an image represented by the obtained image data; an effect extraction unit that extracts an effect applied to the image represented by the obtained image data; an effect data obtaining unit that if a type of the extracted effect is included in predetermined plural types of effect, obtains effect data representing a type of effect selected from among the predetermined plural types of effect, excluding a type of the extracted effect; and a generating unit that generates image data representing an image in which an effect of the type represented by the obtained effect data is applied to the area extracted by the area extraction unit.

18 Claims, 7 Drawing Sheets

IMAGE-PROCESSING DEVICE, IMAGE-FORMING DEVICE, IMAGE-PROCESSING METHOD, AND COMPUTER READABLE MEDIUM

CROSS-REFERENCE TO RELATED APPLICATIONS

This application is based on and claims priority under 35 USC 119 from Japanese Patent Application No. 2009-075176 filed on Mar. 25, 2009.

BACKGROUND

1. Technical Field

The present invention relates to an image-processing device, an image-forming device, an image-processing method, and a computer readable medium.

2. Related Art

A person having color weakness has difficulty in recognizing a certain range of a color. If a document is prepared with multiple colors, and the colors include a color that is difficult to recognize for a person having color weakness, an intended use of the color by a creator of the document may not be conveyed to the person having color weakness.

SUMMARY

An aspect of the present invention provides an image-processing device including: a color storage unit that stores a range of a color within a color space; an effect storage unit that stores plural types of effect to be applied to an image; an obtaining unit that obtains image data; an area extraction unit that extracts an area having a color falling within the range of a color stored in the color storage unit, in an image represented by the image data obtained by the obtaining unit; an effect extraction unit that extracts an effect applied to the image represented by the image data obtained by the obtaining unit; an effect data obtaining unit that if a type of effect extracted by the effect extraction unit is included in the plural types of effect stored in the effect storage unit, obtains effect data representing a type of effect selected from among the plural types of effect stored in the effect storage unit, excluding a type of effect extracted by the effect extraction unit; and a generating unit that generates image data representing an image in which an effect of the type represented by the effect data obtained by the effect data obtaining unit is applied to the area extracted by the area extraction unit.

BRIEF DESCRIPTION OF THE DRAWINGS

Exemplary embodiments of the present invention will be described in detail below with reference to the following figures, wherein.

DETAILED DESCRIPTION (1) First Exemplary Embodiment (1-1) Configuration

Figure 1:
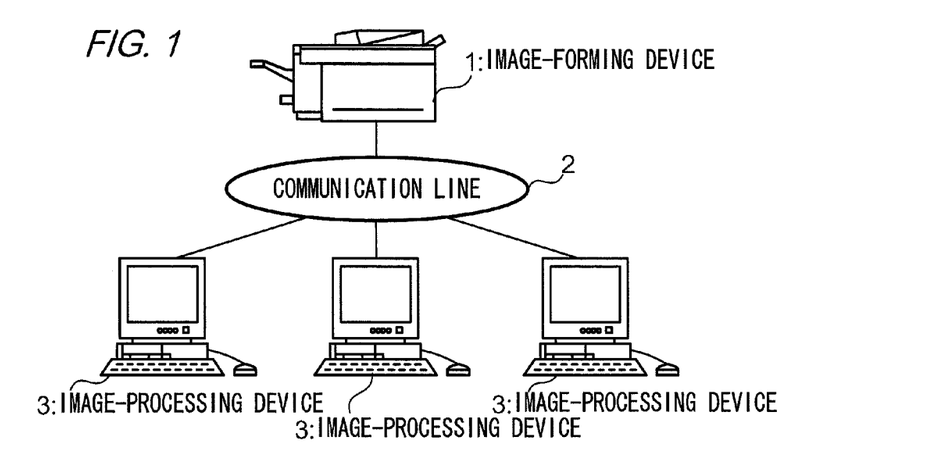
FIG. 1 is a diagram showing an entire configuration of a system according to an exemplary embodiment of the present invention.

FIG. 1 is a diagram showing an entire configuration of a system according to the present exemplary embodiment.

Image-forming device 1 and image-processing devices 3 are connected with each other via communication line 2, which is, for example, a LAN (Local Area Network). Image-forming device 1 has functions of copying, image forming, and image reading. Image-processing devices 3 may be personal computers, which have a function of image processing. Image-processing devices 3 also have a function of providing image-forming device 1 with image data via communication line 2, and providing image-forming device 1 with an instruction to form an image on the basis of the image data. Although FIG. 1 shows a single image-forming device 1 and three image-processing devices 3, there may be a different number of image-forming devices 1 and image-processing devices 3 connected to communication line 2.

Figure 2:
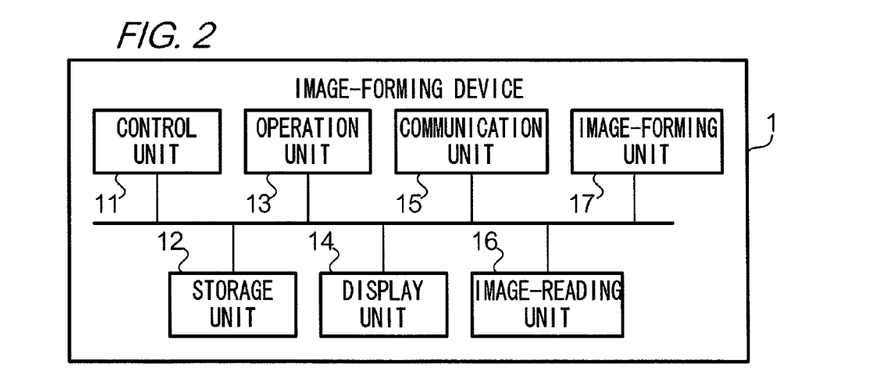
FIG. 2 is a block diagram showing a configuration of image-forming device 1.

FIG. 2 is a block diagram showing a configuration of image-forming device 1.

Image-forming device 1 includes control unit 11, storage unit 12, operation unit 13, display unit 14, communication unit 15, image-reading unit 16, and image-forming unit 17. Control unit 11 includes a CPU (Central Processing Unit), a ROM (Read Only Memory), and a RAM (Random Access Memory). The CPU executes a program stored in the ROM or storage unit 12 to control components of image-forming device 1. Storage unit 12 is a nonvolatile auxiliary storage device such as an HDD (Hard Disk Drive), which stores programs and data. Operation unit 13 includes plural keys, and in response to an operation by a user, outputs a signal corresponding to the operation to control unit 11. Display unit 14 includes a liquid crystal display and a liquid crystal driving circuit, and displays information on progress of a processing or guidance about an operation, on the basis of data provided from control unit 11. Communication unit 15 includes a communication interface, and communicates with image-processing device 3 via communication line 2.

Image-reading unit 16 includes an image pickup device such as a CCD (Charge Coupled Device), and causes the image pickup device to read an image formed on a recording sheet to generate image data representing the read image. Image-forming unit 17 includes a photosensitive drum for holding an image, an exposure unit that exposes the photosensitive drum on the basis of image data to form an electrostatic latent image on the drum, a developing unit that develops an electrostatic latent image to form a toner image, a transfer unit that transfers a toner image to a recording sheet, and a fixing unit that fixes a toner image transferred to a recording sheet, on the recording sheet. Image-forming unit 17 forms an image represented by image data generated by image-reading unit 16, or an image represented by image data received via communication unit 15, on a recording sheet. Namely, image-forming unit 17 forms an image represented by image data generated by an image-forming device, on a recording medium such as a recording sheet.

Figure 3:
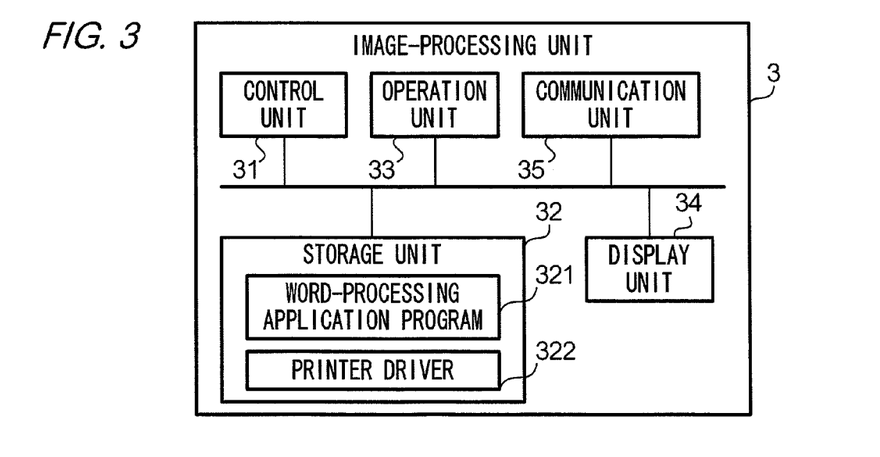
FIG. 3 is a block diagram showing a configuration of image-processing device 3.

FIG. 3 is a block diagram showing a configuration of image-processing device 3.

Image-processing device 3 includes control unit 31, storage unit 32, operation unit 33, display unit 34, and communication unit 35. Control unit 31 includes a CPU (Central Processing Unit), a ROM (Read Only Memory), and a RAM (Random Access Memory). The CPU executes a program stored in the ROM and storage unit 32 to control components of image-processing device 3. Operation unit 33 includes a keyboard and a mouse, and in response to an operation by a user, provides control unit 31 with a signal corresponding to the operation. Display unit 34 may be a CRT (Cathode Ray Tube) or a liquid crystal display. Display unit 34 displays information on the basis of image data provided from control unit 31. Communication unit 35 includes a communication circuit and a communication interface, which communicates with image-forming device 1 via communication line 2.

Storage unit 32 is a nonvolatile auxiliary storage device such as an HDD (Hard Disk Drive), which stores programs and data. Storage unit 32 stores word-processing application program 321. Control unit 31, by following a procedure described in word processing application program 321, generates image data representing a document in which characters, graphics, and/or tables are arranged, in the RAM. Control unit 31 is an example of an obtaining unit that obtains image data.

Storage unit 32 also stores printer driver 322. Control unit 31, by following a procedure described in printer driver 322, converts image data generated using word-processing application program 321 into image data described in a page description language that can be interpreted by image-forming device 1. Printer driver 322 describes a range of a red color within an RGB color space. In the present exemplary embodiment, each color of RGB is represented in 256 shades, and a range of a red color is represented as follows: R=255, G=0 to 51, and B=0 to 51. Storage unit 32 is an example of a color storage unit that stores a range of a particular color within a color space.

Printer driver 322 also describes plural types of effects applied to a red character. The types of effects include hatching, underline, color reversal, bold face, and italic face. A color reversal is a process of surrounding a character with a rectangle, filling in an area inside the rectangle with the color of the character, and changing the color of the character to white. Storage unit 32 is an example of an effect storage unit that stores plural types of effects to be applied to an image.

Printer driver 32 also describes a procedure of an operation carried out by control unit 31 on image data generated using word-processing application program 321. In the operation, control unit 31 applies an effect to an area having a color falling within a range of a particular color, in an image represented by generated image data, thereby generating image data representing an image to which an effect is applied.

(1-2) Operation

Figure 4A:
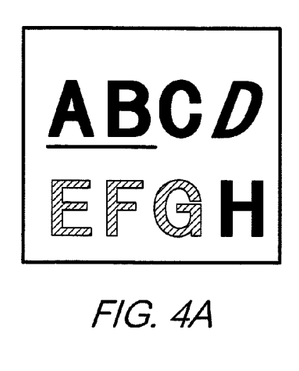
FIGS. 4A to 4B are diagrams showing an image of a character string.
Figure 5:
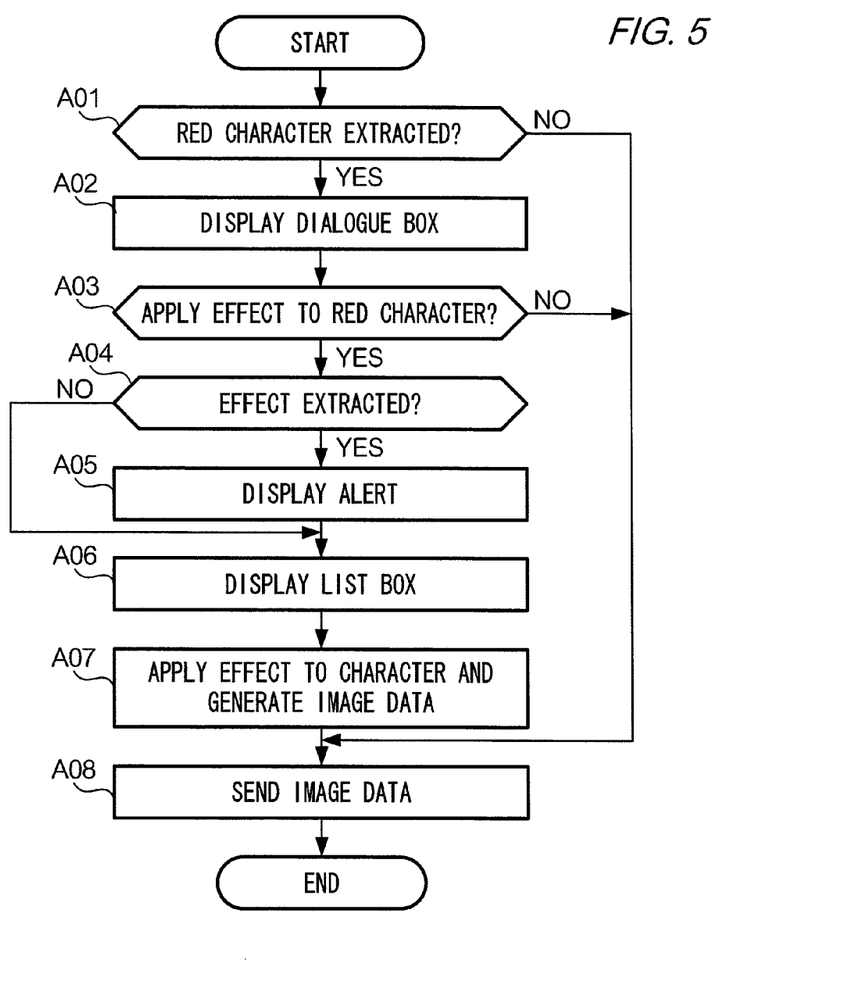
FIG. 5 is a flowchart showing an operation according to a first exemplary embodiment.

A user causes image-processing device 3 to execute word-processing application program 321, and while viewing an image displayed on display unit 34, prepares a document using operation unit 33. If there is a character to be emphasized in the document, the user provides image-processing unit 3 with an instruction to change the color of the character to red, using operation unit 33. FIG. 4A shows an example of a prepared document. In the document, three characters E, F, and G are represented in red, and the other characters are represented in black. Also, two characters A and B are underlined, and character D is represented in italics. Control unit 31, by following a procedure described in word-processing application program 321, generates image data corresponding to an operation by the user in a RAM. Subsequently, if an instruction to print the prepared document is given, control unit 31 executes printer driver 322 to start an operation shown in FIG. 5.

Figure 6A:
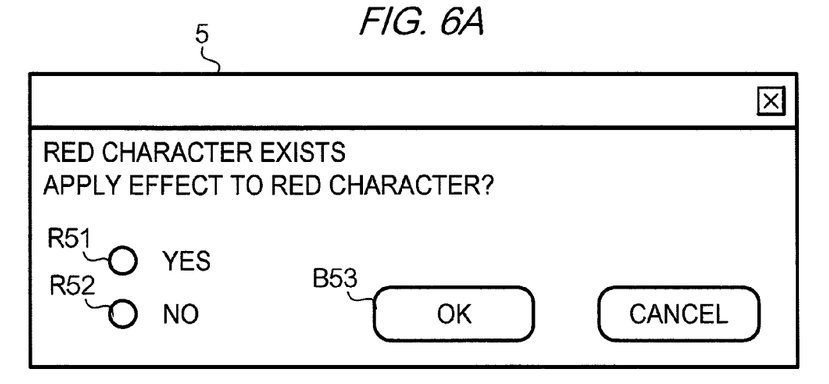
FIGS. 6A to 6B are diagrams showing a dialogue box.

Control unit 31 initially extracts a red character in an image represented by image data (step A01). The image data may describe color information (gray levels of R, G, and B) specifying colors of characters shown in FIG. 4A and character information specifying characters in association with each other. Control unit 31, by comparing the color information and a range of a red color described in printer driver 322, extracts a red character. In the case of the example shown in FIG. 4A, three characters E, F, and G are extracted as a red character. If a red character is extracted (step A01: YES), control unit 31 displays dialogue box 5 on display unit 34 to allow the user to determine whether to apply an effect to the red character, as shown in FIG. 6A (step A02). If a red character is not extracted (step A01: NO), control unit 31 proceeds to step A08.

Control unit 31 is an example of an area extraction unit that extracts an area having a color falling within a range of a color stored in a color storage unit, in an image represented by image data obtained by an obtaining unit.

Dialogue box 5 displayed at step A02 has radio buttons R51 and R52, and the user is able to select either button using operation unit 33. If the user selects radio button R51 corresponding to "YES", and presses soft button B53 corresponding to "OK" (step A03: YES), control unit 31 proceeds to step A04. On the other hand, if the user selects radio button R52 corresponding to "NO", and presses soft button B53 (step A03: NO), control unit 31 proceeds to step A08, without applying an effect to the red character.

At step A04, control unit 31 extracts an effect applied to the image. The image data may describe, in addition to information specifying faces and sizes of characters shown in FIG. 4A, types of effects to be applied to the characters. Control unit 31 reads the types of effects from the image data. In the case of the example shown in FIG. 4A, effects, underline, and italic face, are extracted. Control unit 31, if an effect is extracted in the image (step A04: YES), proceeds to step A05. On the other hand, if no effect is extracted (step A04: NO), control unit 31 proceeds to step A06.

Control unit 31 is an example of an effect extraction unit that extracts an effect applied to an image represented by image data obtained by an obtaining unit.

Figure 6B:
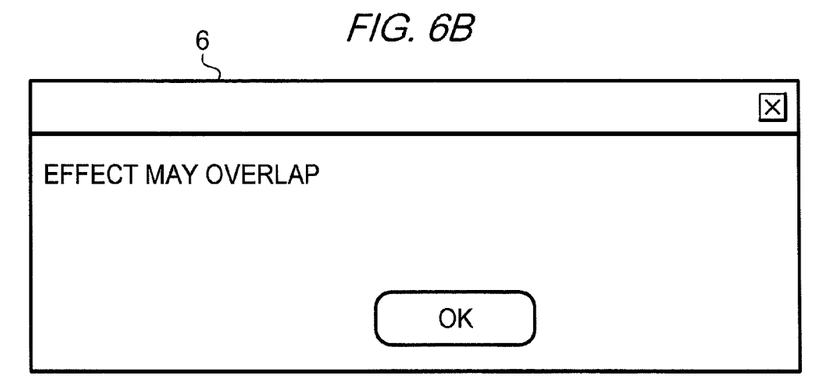
Figure 6C:
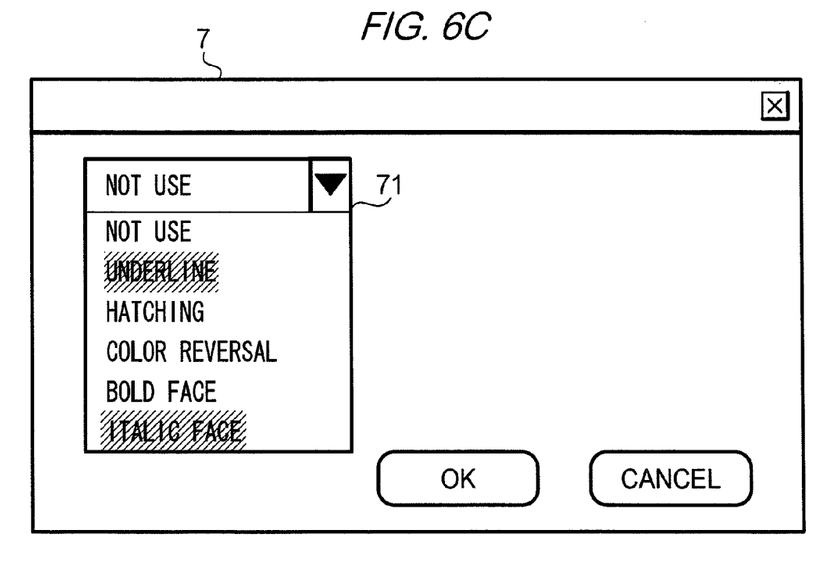

At step A05, control unit 31 displays alert dialogue box 6 on display unit 34, as shown in FIG. 6B. If the user presses soft button B61 corresponding to "OK", control unit 31 displays dialogue box 7 having list box 71 on display unit 34 to allow the user to select a type of effect to be applied to the image, as shown in FIG. 6C (step S06).

In list box 71, the types of effects described in printer driver 322 are displayed. However, the types of effects, underline, and italic face, extracted at step A04 are not selectable, and types of effects other than underline and italic face are displayed as selectable items. When a type of effect is selected, plural types of effects other than underline and italic face may be selected. If an effect is not used, item, "not use" is selected.

Control unit 31 is an example of a presenting unit that, if a type of effect extracted by an effect extraction unit is included in plural types of effects stored in an effect storage unit, presents the plural types of effect stored in the effect storage unit, excluding a type of effect extracted by the effect extraction unit. Control unit 31 is also an example of a specification receiving unit that receives a specification of one or more types of effect from among types of effects presented by a presenting unit. Control unit 31 is further an example of an effect data obtaining unit that obtains data representing a type of effect specified using a specification receiving unit, as effect data.

If the user selects a desired type in list box 71, control unit 31 proceeds to step A07. Control unit 31 writes data representing the type selected at step A06 in the image data in association with the character extracted at step A01. In a case where hatching is selected at step A06, control unit 31 writes data representing hatching in the image data in association with three characters E, F, and G.

Control unit 31 is an example of a generating unit that generates image data representing an image in which an effect of a type represented by effect data obtained by an effect data obtaining unit is applied to an area extracted by an area extraction unit.

At step A08, control unit 31 converts the image data generated at step A07 into image data described in a page-description language, and sends the image data and an instruction to form an image on the basis of the image data to image-forming device 1 via communication line 2.

Figure 4B:
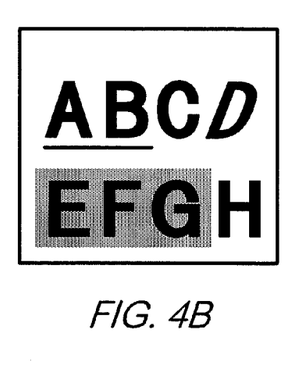

When the image data and the instruction sent from image-processing device 3 is received by communication unit 15 of image-forming device 1, control unit 11 of image-forming device 1 converts the image data into bit-mapped image data, binarizes the bit-mapped image data, and provides image-forming unit 17 with the binarized image data. Image-forming unit 17 forms an image represented by the provided image data on a recording sheet. In a case where hatching is selected at step A06, an image is formed in which three characters E, F, and G are hatched, as shown in FIG. 4B.

(2) Second Exemplary Embodiment

The present exemplary embodiment is a partially modified version of the first exemplary embodiment. Hereinafter, differences between the present exemplary embodiment and the first exemplary embodiment will be described.

Figure 7:
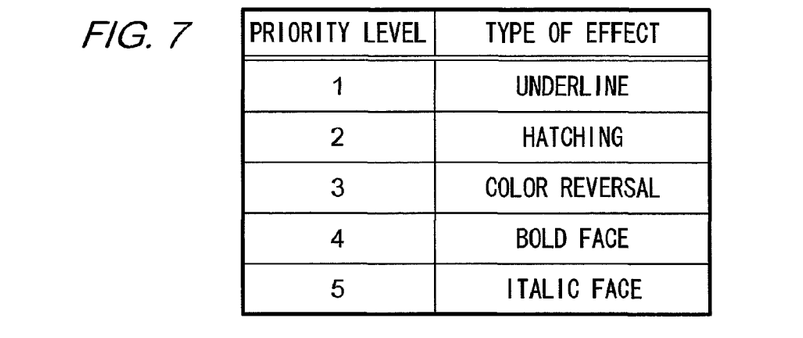
FIG. 7 is a diagram showing priority levels of effects.

Printer driver 322 describes plural types of effect to be applied to a red character. The types of effect have a predetermined priority level, and printer driver 322 describes types of effect and priority levels of the types in association with each other, as shown in FIG. 7.

Control unit 31 is an example of a level storage unit that stores priority levels of types of effect stored in an effect storage unit.

Now, an operation of image-processing device 3 will be described.

Figure 8:
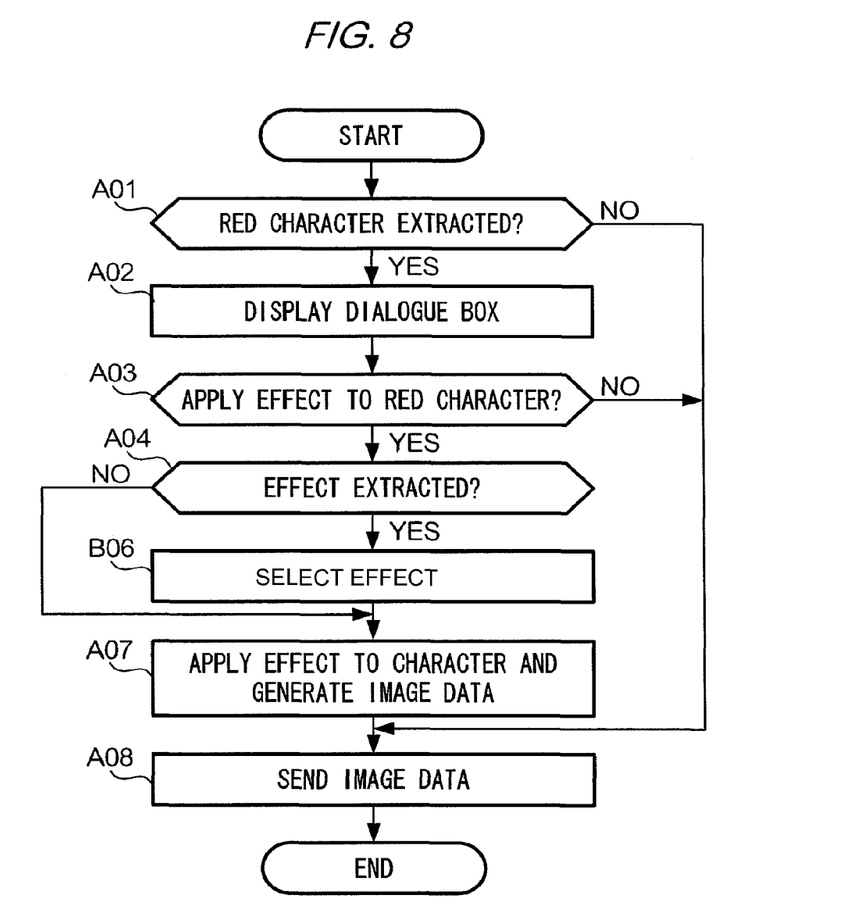
FIG. 8 is a flowchart showing an operation according to a second exemplary embodiment.

FIG. 8 is a diagram showing a procedure of an operation carried out by control unit 31 by executing printer driver 322. Operations of steps A01 to A04 are identical to those of the first exemplary embodiment.

At step B06, control unit 31 selects a type of effect to be applied to a red character extracted at step A01, on the basis of priority levels described in printer driver 322. In a case where at step A04, effects, underline and italic face, are extracted, control unit 31 selects a type of effect having a highest priority level from among types of effect other than underline and italic face. In this case, it is assumed that hatching is selected. However, it is to be noted that plural types of effects may be selected in descending order of priority.

Control unit 31 is an example of a selecting unit that if a type of an effect extracted by an effect extraction unit is included in types of effect stored in an effect storage unit, selects one or more types of effect from among the types of effect stored in the effect storage unit, excluding a type of the effect extracted by the effect extraction unit, on the basis of the priority levels of the types of effect. Control unit 31 is also an example of an effect data obtaining unit that obtains data representing a type of a effect selected by a selecting unit, as effect data.

After the operation of step B06 is completed, control unit 31 proceeds to an operation of step A07. Operations of steps A07 and A08 are identical to those of the first exemplary embodiment. Since hatching is selected at step A06, an image is formed in which three characters E, F, and G are hatched, as shown in FIG. 4B. If an effect is not extracted at step A04 (step A04: NO), an effect of a predetermined type (e.g., underline) is applied to the red character.

(3) Third Exemplary Embodiment

The present exemplary embodiment is a partially modified version of the first exemplary embodiment. Hereinafter, differences between the present exemplary embodiment and the first exemplary embodiment will be described.

Figure 9:
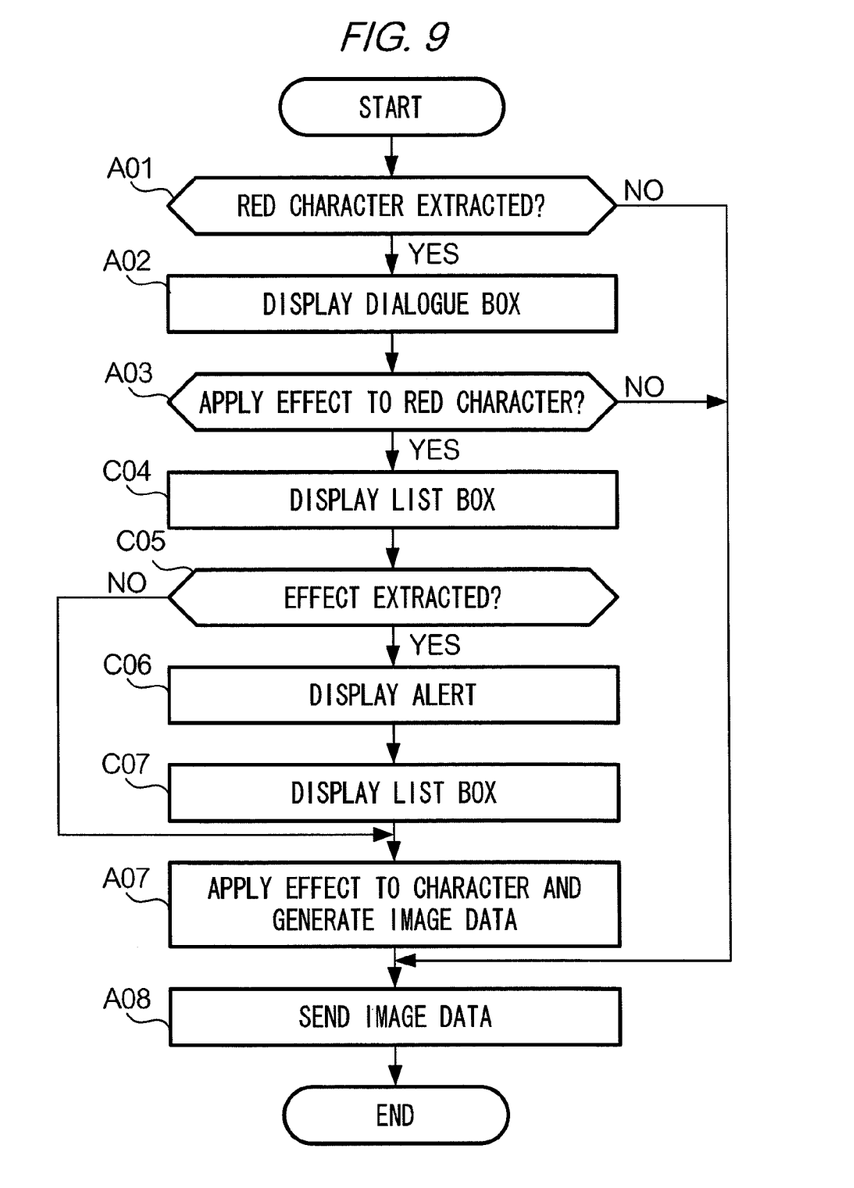
FIG. 9 is a flowchart showing an operation according to a third exemplary embodiment.

FIG. 9 is diagram showing a procedure of an operation carried out by control unit 31 by executing printer driver 322. Operations of steps A01 to 03 are identical to those of the first exemplary embodiment.

At step C04, control unit 31 displays dialogue box 7 having list box 71 on display unit 34 to allow a user to select a type of effect to be applied to an image. In list box 71, all types of effect described in printer driver 322 are displayed as selectable items.

Control unit 31 is an example of a second specification receiving unit that receives a specification of a type of effect to be applied to an image represented by image data obtained by an obtaining unit.

If the user selects a desired type in list box 71, control unit 31 proceeds to an operation of step C05. It is assumed that the user selects underline.

At step C05, control unit 31 extracts an effect of the type selected at step C04 in an image represented by image data. Specifically, control unit 31 initially reads types of effect associated with characters from the image data. In the case of the example shown in FIG. 4A, since effects, underline and italic face, are applied to characters, underline and italic face are extracted as a type of effect. Subsequently, control unit 31 determines whether the extracted types of effect include the type of effect selected at step C04. Since underline is selected at step C04, the extracted types of effect include the type of effect selected at step C04.

Control unit is an example of a second effect extraction unit that extracts an effect of a type specified using a second specification-receiving unit, in an image.

If an effect of the type selected at step C04 is extracted (step C05: YES), control unit 31 proceeds to step C06. If an effect of the type selected at step C04 is not extracted (step C05: NO), control unit 31 proceeds to step A07.

At step C06, control unit 31 displays alert dialogue box 6 on display unit 34, as shown in FIG. 6B. If the user presses soft button B61 corresponding to "OK", control unit 31 displays dialogue box 7 having list box 71 on display unit 34 to allow the user to select a type of effect to be applied to the image, as shown in FIG. 6C (step C07).

In list box 71, types of effect described in printer driver 322 are displayed. However, the effects, underline and italic face, extracted at step C05 are not selectable, and effects other than underline and italic face are displayed as selectable items.

Control unit 31 is an example of a presenting unit that if an effect of a type specified using a second specification receiving unit is extracted by a second effect extraction unit, presents types of effect stored in an effect storage unit, excluding a type of effect extracted by an effect extraction unit and the type of effect extracted by the second effect extraction unit.

If the user selects a desired type in list box 71, control unit 31 proceeds to step A07. Operations of steps A07 and A08 are identical to those of the first exemplary embodiment. If hatching is selected at step C07, an image is formed in which three characters E, F, and G are hatched, as shown in FIG. 4B.

(4) Fourth Exemplary Embodiment

The present exemplary embodiment is a partially modified version of the first exemplary embodiment. Hereinafter, differences between the present exemplary embodiment and the third exemplary embodiment will be described.

Printer driver 322 describes plural types of effect to be applied to a red character. The types of effect have a predetermined priority level, and printer driver 322 describes types of effect and priority levels of the types in association with each other, as shown in FIG. 7.

Control unit 31 is an example of a level storage unit that stores priority levels of types of effect stored in an effect storage unit.

Now, an operation of image-processing device 3 will be described.

Figure 10:
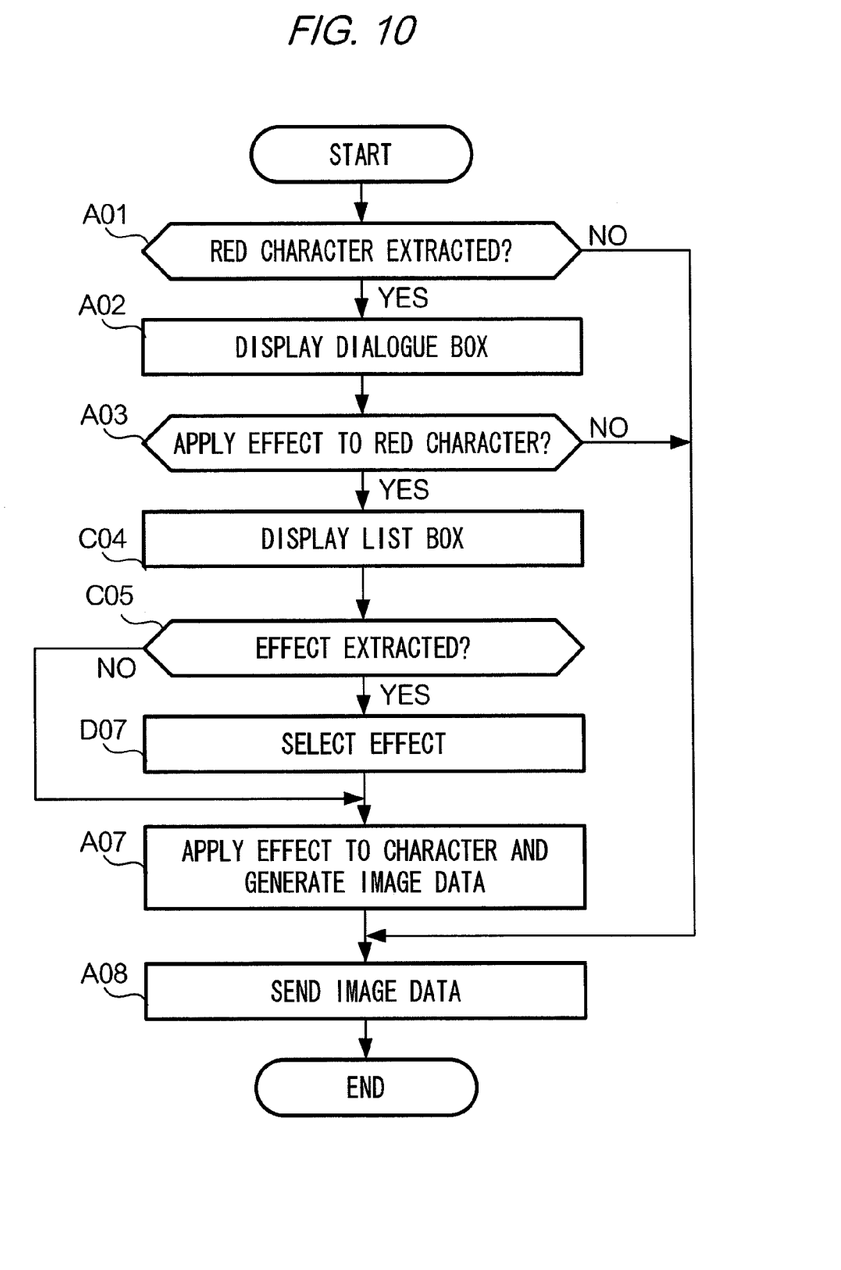
FIG. 10 is a flowchart showing an operation according to a fourth exemplary embodiment.

FIG. 10 is a diagram showing a procedure of an operation carried out by control unit 31 by executing printer driver 322. Operations of steps A01 to C05 are identical to those of the third exemplary embodiment.

At step D07, control unit 31 selects a type of effect to be applied to a red character extracted at step A01, on the basis of priority levels described in printer driver 322. In a case where at step C05, effects, underline and italic face, are extracted, control unit 31 selects a type of effect having a highest priority level among types of effect other than underline and italic face. In this case, it is assumed that hatching is selected. However, it is to be noted that plural types of effect may be selected in descending order of priority.

Control unit 31 is an example of a selecting unit that if an effect of a type specified using a second specification receiving unit is extracted by a second effect extraction unit, selects one or more types of effect from among types of effect stored in an effect storage unit, excluding a type of effect extracted by an effect extraction unit and the type of the effect extracted by the second effect extraction unit, on the basis of priority levels of the types of effect.

After the operation of step D07 is completed, control unit 31 proceeds to an operation of step A07. Operations of steps A07 and A08 are identical to those of the first exemplary embodiment. Since hatching is selected at step D07, an image is formed in which three characters E, F, and G are hatched, as shown in FIG. 4B.

(5) Modifications

Modifications described below may be combined with each other.

(Modification 1)

Figure 11:
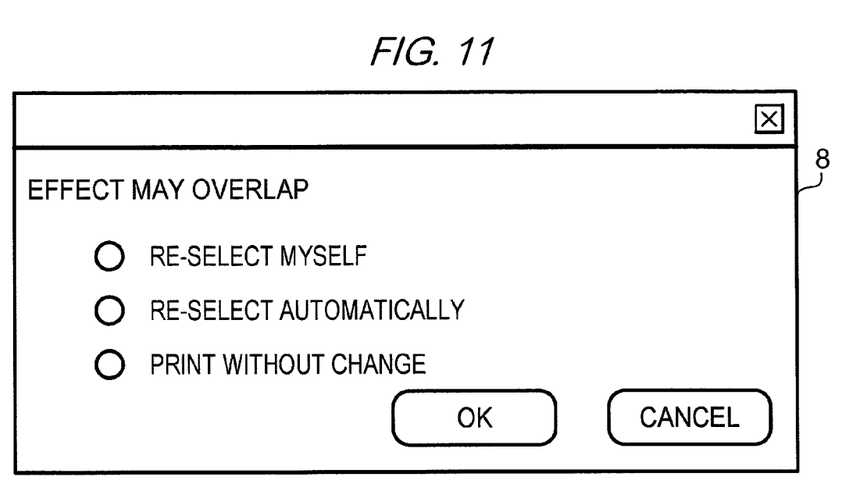
FIG. 11 is a diagram showing a dialogue box.

At step C06 of the third exemplary embodiment, a user may be allowed to select one of three options of: selecting a type of effect by a user, letting an image-processing device select a type of effect, or applying a predetermined effect to a character. For example, dialogue box 8 shown in FIG. 11 may be displayed at step A05 of the first exemplary embodiment, and if radio button R81 corresponding to "re-select myself" is selected, operations from step C07 may be carried out. If radio button R82 corresponding to "re-select automatically" is selected, operations from step B06 of the second exemplary embodiment may be carried out. If radio button R83 corresponding to "print without change" is selected, an effect selected by a user at step C04 may be applied to a character. Among the three options, only two options may be presented to be selectable by a user.

(Modification 2)

Figure 4C:
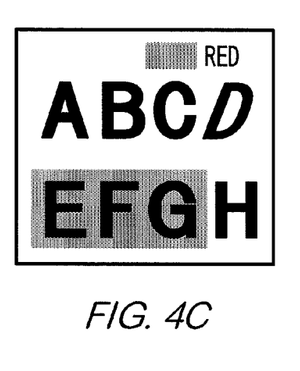

In the first to fourth exemplary embodiments, control unit 31 may add data to an image, representing a color of a character to which an effect is applied. For example, as shown in FIG. 4C, a legend may be added in a blank space, indicating that hatched characters are in red.

Control unit 31 is an example of a generating unit that generates image data representing an image in which an effect of a type represented by effect data obtained by an effect data obtaining unit is applied to an area extracted by an area extraction unit, and an image indicating a color of the area to which an effect is applied.

(Modification 3)

In the above exemplary embodiments, a range of a red color is stored in storage unit 32, and an effect is applied to a character having a color falling within the range. In the exemplary embodiments, a range of any color may be stored in storage unit 32. A person having color weakness has difficulty in recognizing a range of a given color. Such a person may not be able to realize a difference in color between a character represented in a certain range of a color other than black and a character represented in black. Accordingly, a range of a color stored in storage unit 32 may be determined on the basis of a range of a color that is difficult to recognize for a person having color weakness.

It is to be noted that although color weakness is classified into several types on the basis of a range of a color that is difficult to recognize, it is said that a rate of persons having difficulty in recognizing a red color is relatively high. Also, when a character string is represented in a color other than black to highlight it, a red color is commonly used. Accordingly, storing a range of a red color in storage unit 32 is preferable.

(Modification 4)

In the above exemplary embodiments where an effect is applied to a character, an effect may be applied to an image such as a graphic or a table.

Figure 12A:
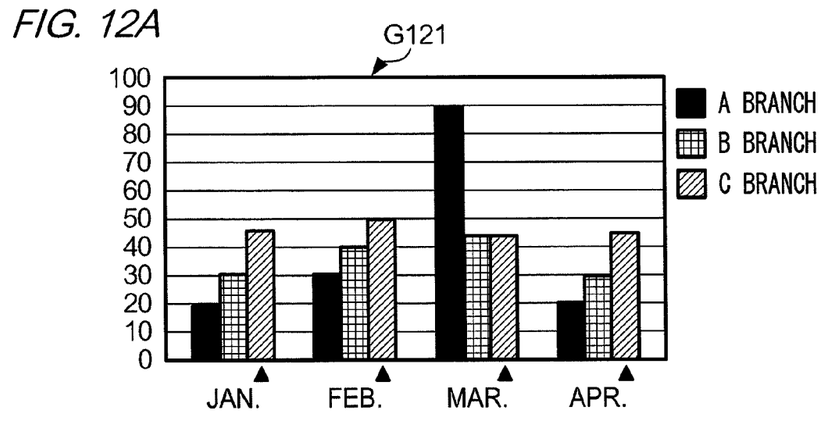
FIGS. 12A and 12B are diagrams showing an image of a bar graph.
Figure 12B:
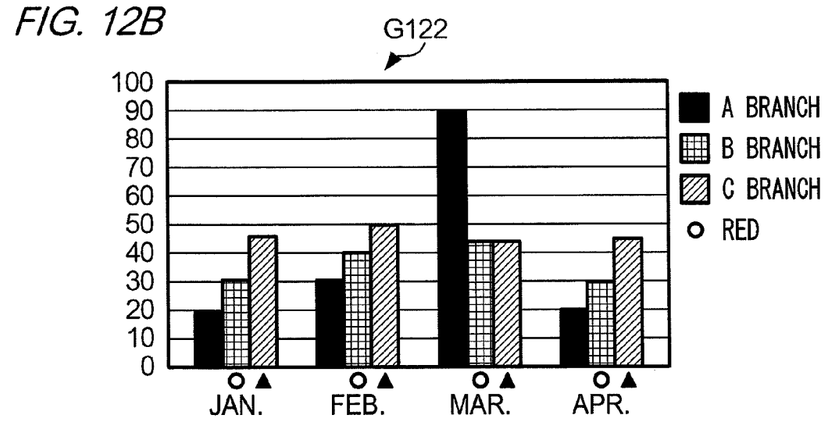

FIGS. 12A and 12B are diagrams showing an effect applied to a bar chart. Bar chart G121 is a pre-processed chart. In the chart, a bar corresponding to A branch is represented in black, a bar corresponding to B branch is represented in red, and a bar corresponding to C branch is represented in green. Also, to highlight bars corresponding to C branch, triangular symbols are shown below the bars.

In contrast, in bar chart G122 which is a processed chart, circular symbols are shown below bars corresponding to B branch, and a legend is shown at the upper right corner of bar chart G122, indicating that the circular symbols indicate that the bars are in red.

(Modification 5)

In the above exemplary embodiments where control unit 31 of image-processing device 3 applies an effect to an image by executing printer driver 322, a program describing a procedure of the operation may be stored in storage unit 12 of image-forming device 1, and the operation may be carried out by control unit 11. If the configuration is employed, an effect may be applied to an image represented by image data representing an image read by image-reading unit 16. Accordingly, an image with an effect may be obtained even in a case where an image formed on a recording sheet is copied.

Also, an ASIC (Application Specific Integrated Circuit) for carrying out the above operation may be provided in image-processing device 3.

(Modification 6)

In the above exemplary embodiments where a range of a particular color is represented by gray levels of an RGB color space, a range of a particular color may be represented in a color space such as an HLS color space representing a color in hue, saturation, and lightness.

(Modification 7)

In the first and third exemplary embodiments, types of effect that are different from that of an effect extracted from an image, from among types of effect stored in storage unit 32, are displayed on display unit 34 in a list box form. In the exemplary embodiments, types of effect that are different from that of an effect extracted from an image may have an assigned unique identification number. Types of effect and their identification numbers may be output by voice from a speaker, and a user may input an identification number of a desired type in image-processing device 3.

(Modification 8)

In the above exemplary embodiments, types of effect that should not be used in combination may be stored in storage unit 32 in association with each other, and combined usage of such effects may be avoided. For example, it is considered that if an underline is used in a document prepared using a spreadsheet, since the underline overlaps a ruled line, the underline is hard to notice. It is also considered that if a character is hatched on a colored background, the hatching is hard to notice. In view of this, a pair of a ruled line and an underline and a pair of a colored background and a hatching may be recorded in a table stored in storage unit 32, and if a component extracted from an image by control unit 31 is stored in storage unit 32, a corresponding effect may be avoided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
    a color storage unit that stores a range of a color within a color space;
    an effect storage unit that stores a plurality of types of effects to be applied to an image;
    an obtaining unit that obtains image data;
    an area extraction unit that extracts an area having a color falling within the range of the color stored in the color storage unit, in an image represented by the image data obtained by the obtaining unit;
    an effect extraction unit that extracts from the image an effect applied to the image represented by the image data obtained by the obtaining unit;
    an effect data obtaining unit that if a type of effect extracted by the effect extraction unit is included in the plurality of types of effects stored in the effect storage unit, obtains effect data representing a type of effect selected from among the plurality of types of effects stored in the effect storage unit, excluding the type of effect extracted by the effect extraction unit; and
    a generating unit that generates image data representing an image in which an effect of the type represented by the effect data obtained by the effect data obtaining unit is applied to the area extracted by the area extraction unit.

2. The image-processing device according to claim 1, further comprising:
    a presenting unit that if a type of effect extracted by the effect extraction unit is included in the plurality of types of effects stored in the effect storage unit, presents the plurality of types of effects stored in the effect storage unit, excluding the type of effect extracted by the effect extraction unit; and
    a specification receiving unit that receives a specification of a type of effect from among the types of effects presented by the presenting unit, wherein the effect data obtaining unit obtains data representing the type of effect specified using the specification receiving unit, as effect data.

3. The image-processing device according to claim 2, further comprising:
    a second specification receiving unit that receives a specification of a type of effect to be applied to the image represented by the image data obtained by the obtaining unit; and
    a second effect extraction unit that extracts an effect of the type specified using the second specification receiving unit in the image, wherein if an effect of the type specified using the second specification receiving unit is extracted by the second effect extraction unit, the presenting unit presents the plurality of types of effects stored in the effect storage unit, excluding the type of effect extracted by the effect extraction unit and the type of effect extracted by the second effect extraction unit.

4. The image-processing device according to claim 1, further comprising:
    a level storage unit that stores priority levels of the plurality of types of effects stored in the effect storage unit; and
    a selecting unit that if a type of effect extracted by the effect extraction unit is included in the plurality of types of effects stored in the effect storage unit, selects a type of effect from among the plurality of types of effects stored in the effect storage unit, excluding a type of effect extracted by the effect extraction unit, on a basis of the priority levels of the plurality of types of effects stored in the level storage unit, wherein the effect data obtaining unit obtains data representing the type of effect selected by the selecting unit, as effect data.

5. The image-processing device according to claim 4, further comprising:
    a specification receiving unit that receives a specification of a type of effect to be applied to the image represented by the image data obtained by the obtaining unit; and
    a second effect extraction unit that extracts an effect of the type specified using the specification receiving unit in the image, wherein if an effect of the type specified using the specification receiving unit is extracted by the second effect extraction unit, the selecting unit selects a type of effect from among the plurality of types of effect stored in the effect storage unit, excluding a type of effect extracted by the effect extraction unit and the type of effect extracted by the second effect extraction unit, on a basis of the priority levels of the plurality of types of effects stored in the level storage unit.

6. The image-processing device according to claim 1, wherein the generating unit generates image data representing an image in which an effect of the type represented by the effect data obtained by the effect data obtaining unit is applied to the area extracted by the area extraction unit, and an image indicating a color of the area to which the effect is applied.

7. The image-processing device according to claim 2, wherein the generating unit generates image data representing an image in which an effect of the type represented by the effect data obtained by the effect data obtaining unit is applied to the area extracted by the area extraction unit, and an image indicating a color of the area to which the effect is applied.

8. The image-processing device according to claim 3, wherein the generating unit generates image data representing an image in which an effect of the type represented by the effect data obtained by the effect data obtaining unit is applied to the area extracted by the area extraction unit, and an image indicating a color of the area to which the effect is applied.

9. The image-processing device according to claim 4, wherein the generating unit generates image data representing an image in which an effect of the type represented by the effect data obtained by the effect data obtaining unit is applied to the area extracted by the area extraction unit, and an image indicating a color of the area to which the effect is applied.

10. The image-processing device according to claim 5, wherein the generating unit generates image data representing an image in which an effect of the type represented by the effect data obtained by the effect data obtaining unit is applied to the area extracted by the area extraction unit, and an image indicating a color of the area to which the effect is applied.

11. An image-forming device comprising:
the image-processing device according to claim 1; and
an image-forming unit that forms an image on a recording sheet, represented by image data generated by the image-processing device.

12. An image-forming device comprising:
the image-processing device according to claim 2; and
an image-forming unit that forms an image on a recording sheet, represented by image data generated by the image-processing device.

13. An image-forming device comprising:
the image-processing device according to claim 3; and
an image-forming unit that forms an image on a recording sheet, represented by image data generated by the image-processing device.

14. An image-forming device comprising:
the image-processing device according to claim 4; and
an image-forming unit that forms an image on a recording sheet, represented by image data generated by the image-processing device.

15. An image-forming device comprising:
the image-processing device according to claim 5; and
an image-forming unit that forms an image on a recording sheet, represented by image data generated by the image-processing device.

16. An image-forming device comprising:
the image-processing device according to claim 6; and
an image-forming unit that forms an image on a recording sheet, represented by image data generated by the image-processing device.

17. An image-processing method comprising:
obtaining image data;
extracting an area having a color falling within a predetermined range of a color within a color space, in an image represented by the obtained image data;
extracting from the image an effect applied to the image represented by the obtained image data;
if a type of the extracted effect is included in a predetermined plurality of types of effects, obtaining effect data representing a type of effect selected from among the predetermined plurality of types of effects, excluding the type of the extracted effect; and
generating image data representing an image in which an effect of the type represented by the obtained effect data is applied to the extracted area.

18. A computer readable non-transitory medium storing a program causing a computer to execute a process for image-processing, the computer comprising:
a color storage unit that stores a range of a color within a color space; and
an effect storage unit that stores plurality of types of effects to be applied to an image, the process comprising:
obtaining image data;
extracting an area having a color falling within the range of the color stored in the color storage unit, in an image represented by the obtained image data;
extracting from the image an effect applied to the image represented by the obtained image data;
if a type of the extracted effect is included in the plurality of types of effects stored in the effect storage unit, obtaining effect data representing a type of effect selected from among the plurality of types of effects stored in the effect storage unit, excluding the type of the extracted effect; and
generating image data representing an image in which an effect of the type represented by the obtained effect data is applied to the extracted area.

\* \* \* \* \*